July 24, 1928.
A. S. TJADEN
1,678,170
LIGHT CONTROL DEVICE FOR HEADLIGHTS
Filed Jan. 23, 1928
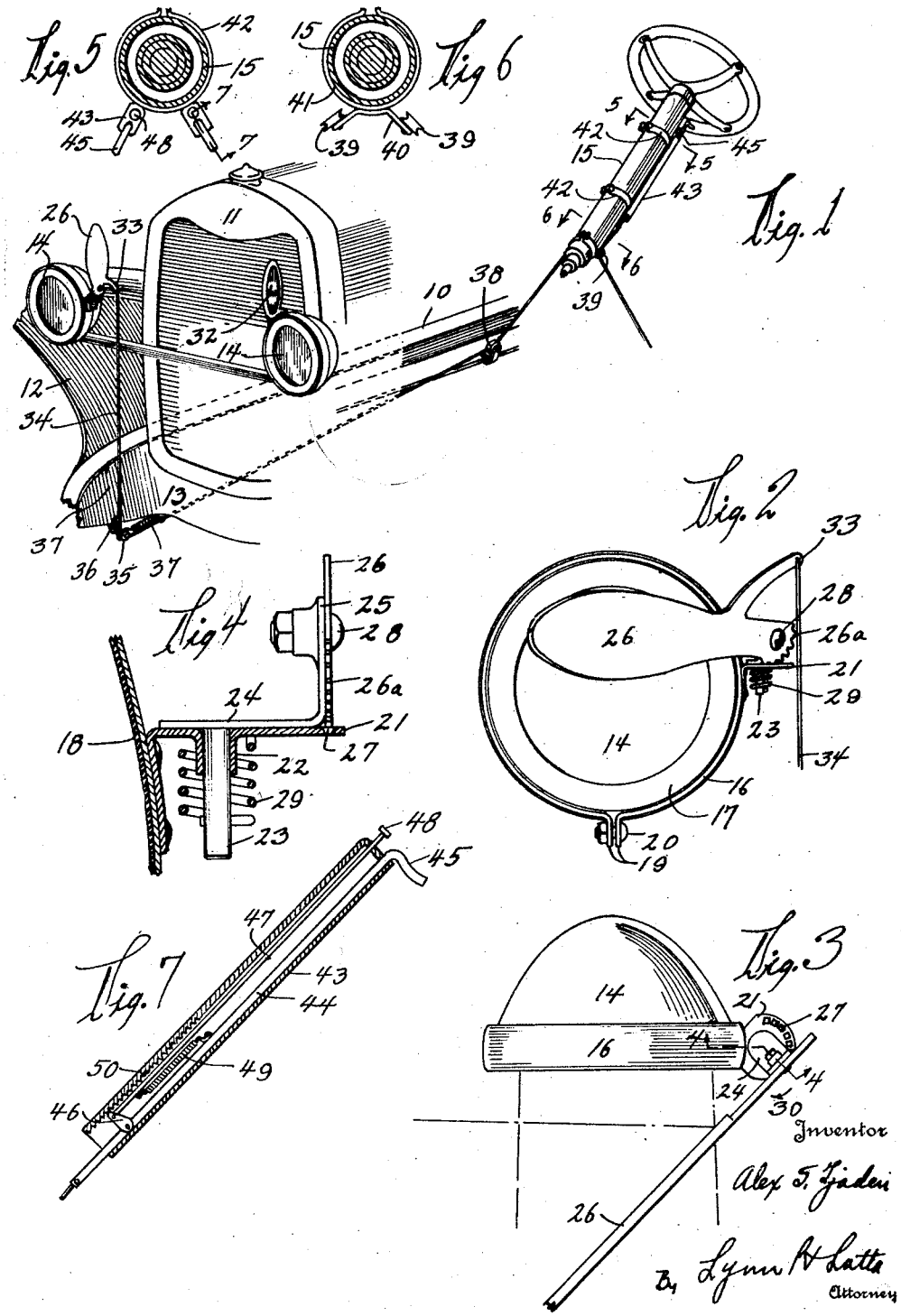

Patented July 24, 1928.

1,678,170

UNITED STATES PATENT OFFICE.

ALEX S. TJADEN, OF SIOUX CITY, IOWA.

LIGHT-CONTROL DEVICE FOR HEADLIGHTS.

Application filed January 23, 1928. Serial No. 248,736.

My invention relates to control devices for headlights and has as its fundamental object to provide a device combining the functions of a headlight dimmer and a spotlight.

This object is attained by the use of a shield element, adapted to be moved to a position cutting off a portion of the rays of light from the headlight and provided with a deflecting surface to throw those rays of light to the side of the road or in a rearward direction.

A further object of my invention is to provide such a device in which the angle to which the light is deflected may be varied at the will of the operator.

A further object is to provide an arrangement in which either side of the road can be covered by a laterally directed beam, the device for one side being controlled separately from the device for the other side.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Fig. 1 is a perspective view of the portions of a vehicle illustrating the light control device attached to one of the headlights.

Fig. 2 is a front elevation of a headlight with my invention attached.

Fig. 3 is a plan view of the same.

Fig. 4 is a detail, sectional view taken on the line 4—4 of Fig. 3.

Fig. 5 is a detail, sectional view taken on the line 5—5 of Fig. 1.

Fig. 6 is a detail, sectional view taken on the line 6—6 of Fig. 1.

Fig. 7 is a detail, sectional view taken on the line 7—7 of Fig. 5.

In Fig. 1, I have used the reference character 10 to indicate generally one of the side rails of a passenger car chassis. The radiator of the vehicle is indicated at 11, one of the front fender aprons at 12, the usual depending skirt 13, extending between the forward ends of the chassis rails and the headlights 14.

The steering wheel post is indicated at 15 disassociated from the remainder of the chassis in the figure but illustrated in substantially its correct position relative thereto.

For each of the headlights 10, I provide a split ring 16, adapted to snugly receive the remainder of the lens retainer 17 of the headlight 14. The ring is preferably provided with a lining of cushioning material 18, such as rubber or the like. (Fig. 4.) The ends of the ring are bent to form a pair of ears 19, through which extends a tightening bolt 20, by means of which the ring may be securely attached to the headlight.

An L shaped bracket 21 is riveted to each of the rings 16, the bracket on one ring being oppositely disposed relative to the bracket on the other ring. Each bracket is provided with a boss or bearing 22 to receive the trunnion 23 of the shield carrying bracket 24. The bearing 22 extends downwardly from the bracket 21 in a vertical direction and thus the shield carrying bracket 24 is allowed to rotate upon a vertical axis.

The bracket 24 has a vertical arm 25, upon which is fulcrumed the shield 26. The shield 26 is oblong or oval in shape of the proper dimensions to intercept the upper portion of the headlight beam when positioned in front of the headlight at an angle of approximately 45°, as shown in Fig. 3. One end of the shield is extended to reach the bracket 25 and is formed as a gear segment 26ᵃ. The segment 26ᵃ meshes with a number of depressions or openings 27, formed in the bracket 21, concentric with the axis of the bearing 22.

The bolt or pin 28, which hinges the shield 26 to the bracket arm 25 is centered relative to the teeth of the gear segment 26ᵃ.

A coil spring 29 is secured at one end to the trunnion 23, is coiled around the trunnion and the bearing 22 and is secured at its other end to the bracket 21. The spring 29 is placed under pressure both in an axial and in a circumferential direction, whereby it serves the double purpose of retaining the bracket 24 against tipping under the weight of the shield 26 and to urge the bracket 24 in the direction indicated by the arrow 30 in Fig. 3.

It will be understood when following the description of the attachment shown in Figs. 2, 3 and 4, which happens to be the attachment for the left headlight, that the attachment for the right headlight is arranged with its parts disposed in reverse order but in symmetrical relation thereto.

The side of the shield facing the headlight is provided with a mirror 32.

A lever arm 33 is formed on or attached to the shield 26 near the fulcrum thereof and extends to a position beyond the fulcrum in a direction opposite that of the shield and to one side of the longitudinal axis of the shield.

A cable 34 is attached to the end of the arm 33 and extends vertically downwardly around a pulley 35, attached by means of a clamp bracket 36 to the skirt 13 of the vehicle or to any suitable portion of the chassis below the radiator 11. The cable 34 thence extends rearwardly under the chassis and around other pulleys to the control device which will later be described.

A spring 37 is attached to the cable 34 and to the chassis of the car at some convenient point, such as illustrated in Fig. 1, between the pulley 35 and the arm 33. The function of the coil spring 37, which is at all times under tension, is to pull the cable through the pulleys, around which it must pass, and to relieve this strain from the spring 29. Thus the spring 29 need serve only to rotate the bracket 24.

It will now be seen that upon releasing of the cable 34, that the springs 37 will slack that portion of the cable extending between the pulley 35 and the arm 33 and that the coil spring 29 will then rotate the bracket 24, the gear segment 26ª meshing with the depressions 27 in the bracket 21 and causing the shield 26 to swing about its trunnion 28. The parts are arranged so that the shield 26 will have a normal or inoperative position extending vertically in a plane parallel to the path of movement of the vehicle, as shown in Fig. 1. From this position, it may swing downwardly to any of a number of intermediate positions, its angle relative to the headlight lens decreasing as it swings lower.

The distance from the respective axes of the trunnions 28 and 23 to the center line upon which the gear teeth mesh is proportioned so that the angle of the shield 26, when it has moved so that its longitudinal axis is horizontal, will be 45°, relative to the headlight lens, as shown in Fig. 3. In this position, the light from the headlight will be thrown directly to the side of the road. By lifting the shield slightly, the light may be thrown laterally and forwardly. By lowering it below the horizontal position, the light may be thrown laterally and rearwardly.

It may be noted that at all times the shield 26 will be positioned in a vertical plane, due to the fact that the arm 25 is vertical, no matter what position it may assume.

Thus the beam of light which is reflected will at all times be horizontal.

The cable 34 extends rearwardly under the chassis of the vehicle to a point lateral of the steering post 15, thence around a pulley 38, secured to the rail 10, thence upwardly to a pulley 39, carried by a suitable bracket 40 secured to the steering post by a split ring 41 and thence parallel to the steering post to the control device shown in Fig. 7. A control device is provided for each of the cables 34 and the two controls are carried by a pair of split rings 42 (Fig. 5); they are positioned approximately 60° apart underneath the steering post so that both controls may be operated simultaneously by the finger of one hand while the other hand operates the steering wheel.

Each control includes a barrel 43, secured to the rings 42 and a sliding plunger 44, to one end of which the cable 34 is attached. The upper end of the plunger is provided with a handle 45, by means of which it is operated. A pawl 46 is mounted upon the plunger and is controlled by a rod 47, slidingly mounted in the barrel 43 and provided with a thumb button 48 at its upper end. A spring 49 resiliently maintains the pawl 46 in engagement with a rack 50 in the barrel 43 and by pressing upon the button 48, the pawl 46 may be held out of engagement with the rack in order to slide the plunger downwardly. When pulling upwardly upon the plunger, the pawl 46 will ride over the rack.

It will now be seen that the plunger 44 will normally be pulled out to retain the shields 26 in their vertical position. By pulling upwardly slightly upon the plunger and simultaneously pressing upon the button 48, the pawl 46 may be released and the plunger allowed to slide downwardly to the correct position whereupon the button 48 may be released and the plunger locked to maintain the shield in that position. When it is desired to return the shield to its inoperative position, the plunger is pulled upwardly again.

Some changes may be made in the construction and arrangement of the parts of my invention without departing from the real spirit and purpose of my invention, and it is my intention to cover by my claims, any modified forms of structure or use of mechanical equivalents, which may be reasonably included within their scope.

I claim as my invention:

1. In a device of the class described, a combined headlight dimmer and light deflector adapted to be interposed at an angle across the path of light rays from the headlight so as to intercept the upper portion of said rays and to deflect them to the side of the road, a bracket upon which said dimmer and deflector is hinged on a horizontal axis, transverse to its own plane, and a bracket upon which said first mentioned bracket is journalled on a vertical axis, said latter bracket being supported at the side of a headlight, and means to move the first mentioned bracket upon its axis and to swing the dimmer and deflector about its axis.

2. In a device of the class described, a combined headlight dimmer and light deflector adapted to be interposed at an angle across the path of light rays from the headlight so as to intercept the upper portion of said rays and to deflect them to the side of the road, a bracket upon which said dimmer and deflector is hinged on a horizontal axis, transverse to its own plane, and a bracket upon which said first mentioned bracket is journalled on a vertical axis, said latter bracket being supported at the side of a headlight, and means to move the first mentioned bracket upon its axis and to swing the dimmer and deflector about its axis, the dimmer and deflector being linked to the second mentioned bracket so as to automatically translate rotating movement about the vertical axis to swinging movement about the horizontal axis.

3. In a device of the class described, a headlight dimmer adapted to be interposed at an angle across the path of light rays from the headlight so as to intercept the upper portion of said rays and to deflect them to the side of the road, a bracket upon which said dimmer is hinged on a horizontal axis, transverse to its own plane, and a bracket upon which said first mentioned bracket is journalled on a vertical axis, said latter bracket being supported at the side of a headlight, and means to move the first mentioned bracket upon its axis and to swing the dimmer about its axis.

4. In a device of the class described, a headlight dimmer adapted to be interposed at an angle across the path of light rays from the headlight so as to intercept the upper portion of said rays and to deflect them to the side of the road, a bracket upon which said dimmer is hinged on a horizontal axis, transverse to its own plane, and a bracket upon which said first mentioned bracket is journalled on a vertical axis, said latter bracket being supported at the side of a headlight, and means to move the first mentioned bracket upon its axis and to swing the dimmer about its axis, the dimmer being linked to the second mentioned bracket so as to automatically translate rotating movement about the vertical axis to swinging movement about the horizontal axis.

5. In a device of the class described, a bracket adapted to be supported at the side of a headlight, a second bracket journalled on said first bracket on a vertical axis, transverse to its own plane, a dimmer hinged on a vertical axis to said second bracket, a gear segment secured to said dimmer and concentric with its horizontal axis, a gear segment on the first bracket, meshing with said dimmer gear segment, and means to move the dimmer about its horizontal axis, whereby it will also move about the vertical axis.

6. In a device of the class described, a combined dimmer and light deflector, means mounting said dimmer and deflector on a headlight for movement about a vertical axis and for movement about an axis perpendicular to the plane of the dimmer and deflector, and means for controlling movement of said dimmer and deflector about both axes, the parts being so arranged that the said dimmer and deflector may move from a position above the headlight beam into the headlight beam, moving in its own plane, and may also swing about its vertical axis to vary its horizontal angle relative to the beam, without interfering with its translatory movement in its own plane.

Signed this 16 day of January, 1928, in the county of Woodbury and State of Iowa.

ALEX S. TJADEN.